(12) United States Patent
Bhattacharya

(10) Patent No.: US 6,954,781 B2
(45) Date of Patent: Oct. 11, 2005

(54) MESSAGING SYSTEM FOR DIRECTING A SERVER TO CONVERT VOICE MESSAGE INTO TEXT AND APPENDING A CONVERTED TEXT MESSAGE TO ANOTHER CONVERTED TEXT MESSAGE

(75) Inventor: Jaijit Bhattacharya, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 09/919,730

(22) Filed: Aug. 1, 2001

(65) Prior Publication Data

US 2003/0028602 A1 Feb. 6, 2003

(51) Int. Cl.⁷ .............................................. G06F 15/16
(52) U.S. Cl. .................... 709/206; 709/247; 379/88.14; 379/88.17
(58) Field of Search ................................ 709/206, 247; 379/88.14, 88.17

(56) References Cited

U.S. PATENT DOCUMENTS

| | | |
|---|---|---|
| 5,434,907 A | 7/1995 | Hurst et al. |
| 5,577,103 A | 11/1996 | Foti |
| 5,608,786 A | 3/1997 | Gordon |
| 5,684,862 A | 11/1997 | Finnigan |
| 5,768,683 A | 6/1998 | Mulford |
| 5,802,466 A | 9/1998 | Gallant et al. |
| 5,884,160 A | 3/1999 | Kanazaki |
| 6,091,947 A | 7/2000 | Summer |
| 6,097,962 A | 8/2000 | Corriveau et al. |
| 6,125,281 A | 9/2000 | Wells et al. |
| 6,215,858 B1 * | 4/2001 | Bartholomew et al. .. 379/88.17 |
| 6,609,157 B2 * | 8/2003 | Deo et al. .................... 709/247 |
| 6,775,689 B1 * | 8/2004 | Raghunandan .............. 709/206 |
| 6,832,245 B1 * | 12/2004 | Isaacs et al. ................ 709/206 |
| 2002/0019851 A1 * | 2/2002 | Pollack ........................ 709/206 |
| 2002/0067808 A1 * | 6/2002 | Agraharam et al. ...... 379/88.14 |

FOREIGN PATENT DOCUMENTS

| | | |
|---|---|---|
| EP | 0938213 | 8/1999 |
| WO | WO 9965256 | 12/1999 |
| WO | WO 0106748 | 1/2001 |

OTHER PUBLICATIONS

PCT International Search Report, Sep. 17, 2002, 4 pages.

* cited by examiner

*Primary Examiner*—Wen-Tai Lin
(74) *Attorney, Agent, or Firm*—McGinn & Gibb, PLLC; T. Rao Coca, Esq.

(57) ABSTRACT

A messaging system support service advantageously allows various types of messaging systems to send intelligent notification alerts to message recipient(s). The Short Message System (SMS) can be used with Global System for Mobile communication (GSM) cellular telephone networks to send an intelligent alert to a mobile phone after a voice message has been delivered to the recipient's voice mail box. In reply, the recipient can respond with a SMS message that directs the voice mail box to take one or more predetermined directions in relation to the message.

15 Claims, 5 Drawing Sheets

MESSAGING SYSTEM FOR DIRECTING A SERVER TO CONVERT VOICE MESSAGE INTO TEXT AND APPENDING A CONVERTED TEXT MESSAGE TO ANOTHER CONVERTED TEXT MESSAGE

FIELD OF THE INVENTION

The invention relates to messaging systems and relates more particularly to messaging system features that enhance the utility of the messaging system.

BACKGROUND

Numerous messaging techniques exist, including electronic mail systems (e-mail) and voice messaging (voice mail) systems. However, existing systems rely on the user being able to contact the messaging system service and interact with the service. For example, if a phone company supports voice messaging, the user is advised of the arrival of the voice message only when he or she checks with the relevant service to find out if such a voice message has been received.

U.S. Pat. No. 5,434,907 issued Jul. 18, 1995 to Hurstel et al describes a voice mail notification system. A message count, representing the number of pending voice mail messages for telecommunication service subscriber, is updated and the subscriber is automatically notified.

U.S. Pat. No. 6,091,947 issued Jul. 18, 2000 to Summer describes a wireless messaging system used to determine when link performance is inadequate for a live connection, so that the voice call can be rediverted to a voice message box. A wireless base unit conveys the accepted voice mail to a mobile handset using a store and forward protocol. The mobile handset stores the conveyed voice mail message for playback by the user.

U.S. Pat. No. 5,802,466 issued Sep. 1, 1998 to Gallant et al describes a system in which a voice mail messaging center directs a call to a voice mailbox associated with a mobile communication device, to record a message when the mobile communication device is unable to receive the call. The voice mail messaging center optimizes communication from the messaging center to the mobile communication device by sending a first message indicator to the mobile communication device when a voice mail is recorded and the voice mailbox contains no messages.

U.S. Pat. No. 5,768,683 issued Jun. 16, 1998 to Mulford describes a method for automatic re-transmission of voice messages by a mobile communication unit. An identification code is continuously embedded in the voice mail message and, where this code matches that stored in the mobile communication unit, retransmitting the voice mail message after a predetermined period of time.

U.S. Pat. No. 5,577,103 issued Nov. 19, 1996 to Foti describes a method of providing service information to subscribers in a cellular telecommunications network using the short message service. A subscriber in a cellular telephone network is provided with information via SMS, from a subscriber service profile. The service profile information is appended to a short message service (SMS) message which is transmitted from the mobile switching center to the mobile station.

U.S. Pat. No. 5,684,862 issued Nov. 4, 1997 to Finnigan describes a voice message store and forward service. This reference describes a method of conveying a voice message between an originating voice message system and a destination voice message system employing a different set of features. The described system is limited to providing the mechanism for storing and forwarding voice messages.

U.S. Pat. No. 5,884,160 issued Mar. 16, 1999 to Kanazaki describes a mechanism to temporarily store voice mail message from callers in correspondence with called mobile terminals when the called mobile terminals are in a "communication disabled" state. This reference also describes a method of notifying at least one of the called mobile terminals to receive voice mail messages stored in the message storing means that are destined for the called mobile terminals.

U.S. Pat. No. 6,097,962 issued Aug. 1, 2000 to Corriveu et al describes a method of handling SMS messages in a radio telecommunications network when an originating mobile station-based Short Message Entity (MS-SME) sends a SMS origination message while operating in a Mobile Switching (MSC) and then moves into a second MSC before the MS-SME receives a SMS acknowledgment message.

U.S. Pat. No. 6,125,281 issued Sep. 6, 2000 to Wells et al. describes a real-time SMS application messaging using a SMSC-linked server. This reference describes a method of operating a wireless mobile station of a type that is capable of bi-directional communication and which has a SMS center.

Despite various existing prior art systems, a need clearly exists for a messaging system which at least attempts to address one or more of the limitations of the prior art.

SUMMARY

A messaging system support service advantageously allows various types of messaging systems to send notification alerts to message recipient(s). Recipient(s) can respond to such alerts by sending a message in reply that instructs a predetermined action in relation to the received message. Such messaging support can be provided to messages that are text or multimedia in nature. Network operators can desirably use such a system to facilitate the transmission and reception of messages over a communications network.

In described implementations, the Short Message System (SMS) can be used with Global System for Mobile communication (GSM) cellular telephone networks to send an intelligent alert to a pervasive device (for example, a mobile phone in this case) to send, after a voice message has been delivered, from the sending mobile network to the receiving mobile network's voice mail box for the recipient.

Voice messages are sent between cellular phones and the end recipient is near-instantaneously alerted to the arrival of the voice message. This can provide an economically attractive option for messaging, especially when the cellular phones are in different home networks, and a regular call between the cellular phones would typically incur relatively expensive charges from the caller's and/or receiver's cellular carrier.

The described techniques also apply to other types of messaging systems in which it is desirable that the end-recipient be intelligently and near-instantaneously alerted to the arrival of a message, so that the user can take any one or more of a number of predetermined actions on that message. Such a feature can maintain or even enhance the value of the received message.

DETAILED DESCRIPTION

Figure 1:
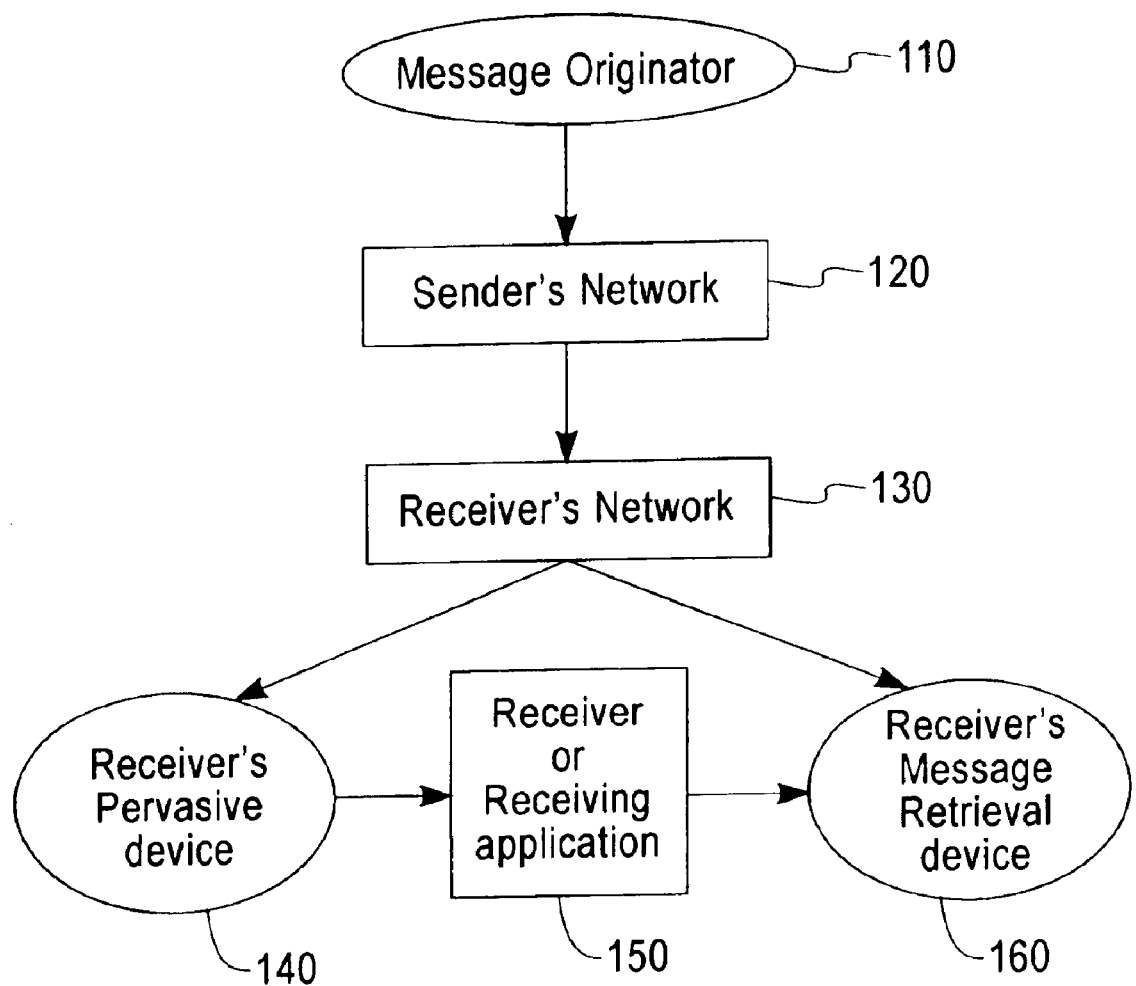
FIG. 1 is a schematic drawing representing the various components involved in a described messaging system.

FIG. 1 provides an overview of the components of a messaging system for which a support service is provided. The message originator 110 can be a person or an automated system that sends information to another person or system (in a different network, in the example shown in FIG. 1). The message is sent to the sender's network 120, which generates metadata for the message and encodes the message. The encoded message (and the metadata) is sent to the receiving network 130 as a data package consisting of header data (that is, the metadata) and the message.

The receiving network 130 transmits an alert to the pervasive device 140 operated by a receiving person/receiving application 150. As described is further detail below, the receiving person/receiving application 150 can perform a predetermined set of operations on the message without retrieving the message. Such operations include: forwarding the message, archiving the message, deleting the message etc. The receiving person/receiving application 150 can also retrieve the message from the receiving network 130.

Figure 2:
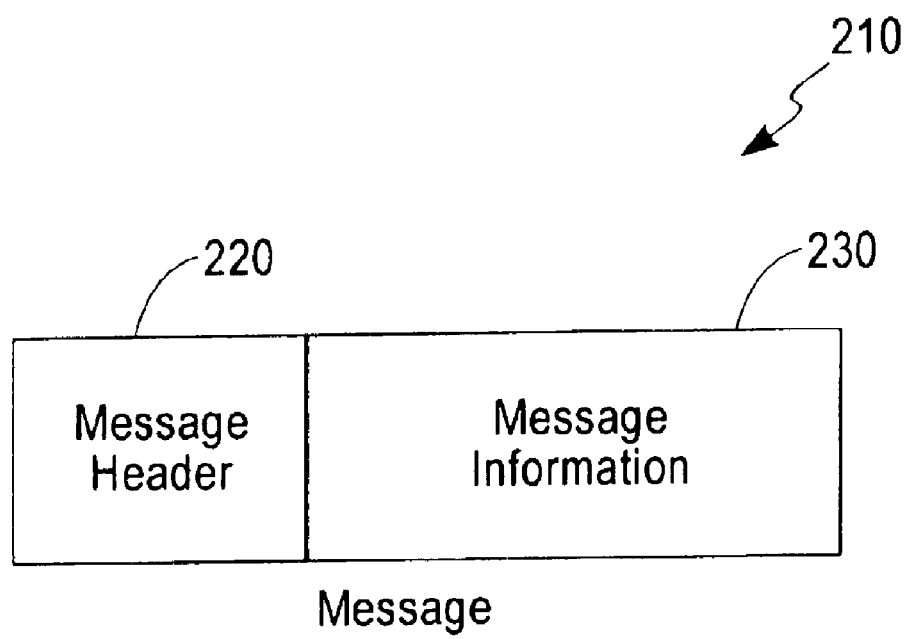
FIG. 2 is a schematic representation of a message format of messages sent in the messaging system of FIG. 1.

FIG. 2 represents a message 210, of the type referred to above, consisting of a message header 220, and message information 230. The message header 220 contains all required meta-data for the message. This meta-data may include, for example, sender information, receiver or destination information, and other message meta-data. The message information 230 contains the actual information (that is, semantic) content of the message 210 that is passed to the recipient 150.

Figure 3:
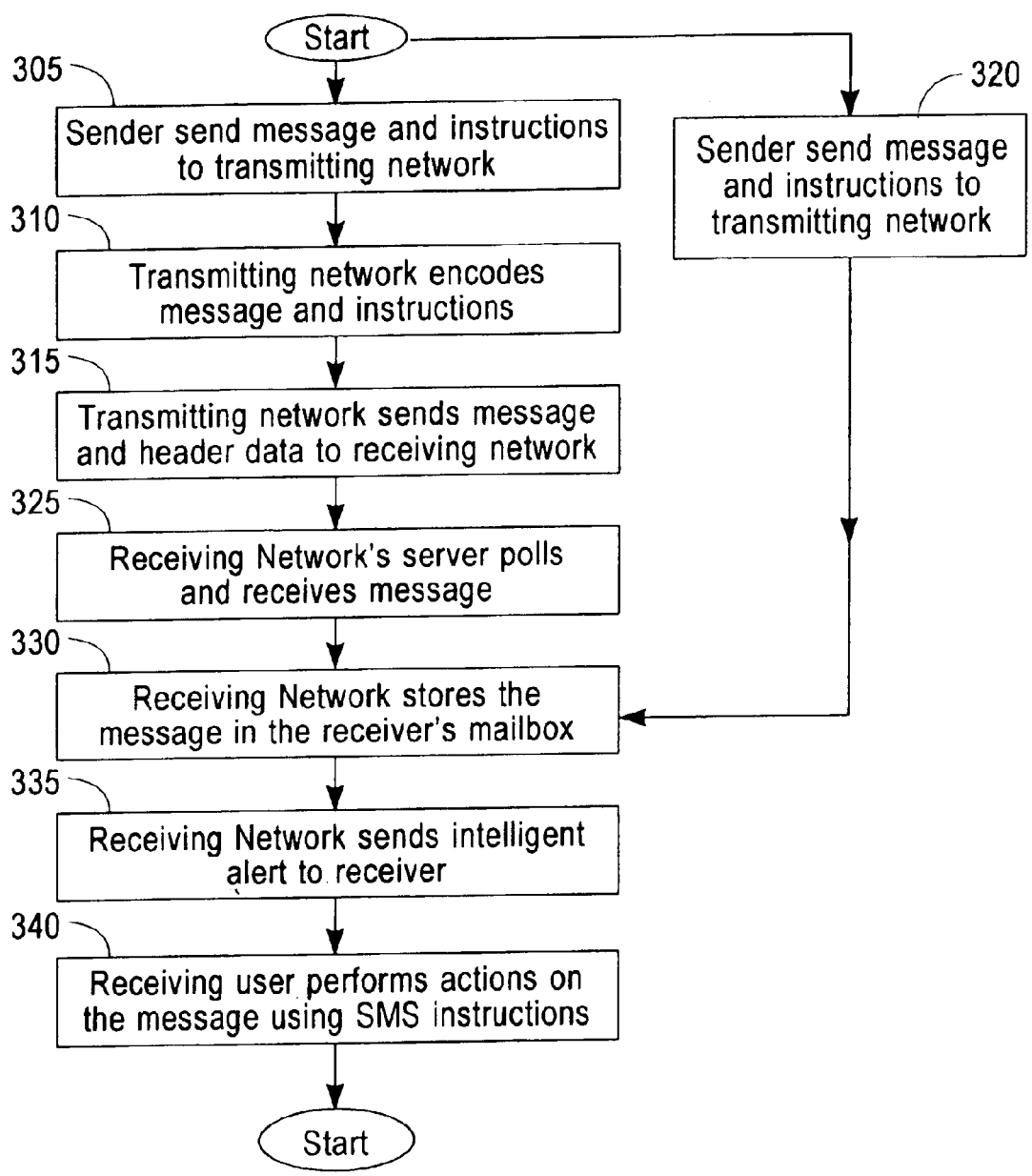
FIG. 3 is a flowchart of the steps that occur in transmitting a message using the message system of FIG. 1.

FIG. 3 represents the steps that occur when a message 210 is transmitted in the messaging system of FIG. 1. In this case, the sending network 120 is a mobile telephony network, the receiving network 130 is also a mobile telephony network, and the message 210 sent is a voice mail message. Each of the steps shown in FIG. 3 is outlined below using the same numbering scheme.

Step 305

The message originator 110 is a mobile phone user. The sender's network 120 (referred to as the transmitting network in this example) is therefore a mobile telephone network. The user transmits a voice message, via the transmitting communications network 120, directed to the intended receiving user or users 150. The transmitting user 110 may elect to include a subject or text header to indicate the content of the message 210 to the receiving user 150. The transmitting user 110 has the option of specifying whether receiving users 150 can view which other receiving users 150 may have also received the message 210. This option is analogous to the carbon copy (cc)/blind copy (bc) messaging options typical in email client programs.

Step 310

The message 120 produced by the transmitting user 110 is encoded for transmission by the network operator of the transmitting communications network 120. The transmitting network 120 adds the sender's options and preferences and the sender details as a message 220 header (header data is the metadata of the message). The transmitting network 120 may also convert a part of the voice message 230 to text and add that to the header data 220.

Step 315

The network operator of the transmitting communications network 120 transmits the message 210 to the network operator of the receiving communications network 130 that services the receiving user 150. The message 210 is transmitted through the communications network 130.

Step 320

As an alternative, the transmitting user 110 sends a message directly to a receiving user's network 130, specifying the receiving user's cellular telephone number.

Step 325

A server used in the receiving communications network 130 polls and receives the transmitted message 210 for the receiving user 150 who uses the receiving communications network 130.

Step 330

The network operator for the receiving communications network 130 updates the message box for the receiving user 150. The message 210 may be stored in the message box of the receiving user 150, or stored elsewhere for retrieval by the receiving user 150, either directly or through the message box.

Step 335

The network operator of the receiving communications network 130 sends the receiving user 150 an intelligent alert in the form of a SMS message. The alert consists of the header data 220 of the message 210. Since the message 210 is a voice message, the first few words of the message 210 may be converted into text and transmitted as part of the alert. This message "summary" may be treated as part of the message meta-data. Depending on the instructions of the transmitting user 150 in generating the message 210, the list of other receiving users 150 may also be part of the alert.

Step 340

The receiving user 150 may perform certain actions on the message 210 using SMS, without actually retrieving the message 210. The receiving user 150 may also retrieve the message 210 from the receiving communications network 130 using, for example, the public switched telephone network and a regular telephone or facsimile machine.

Step 345

The receiving user 150 can also retrieve the message 210 using an Internet-enabled device via the Internet.

In the above steps, the receiving user 150 may obtain a list of the other receiving users 150 to whom a received message 210 has also been sent, if such an action is permitted by the transmitting user. The receiving user 150 can forward the received message 210 to others using a DTMF-based (that is, touch tone) menu, or by sending appropriate SMS messages. The receiving user 150 may elect to delete a message 210 (based on the text summary of the message) before it is downloaded.

Figure 4:
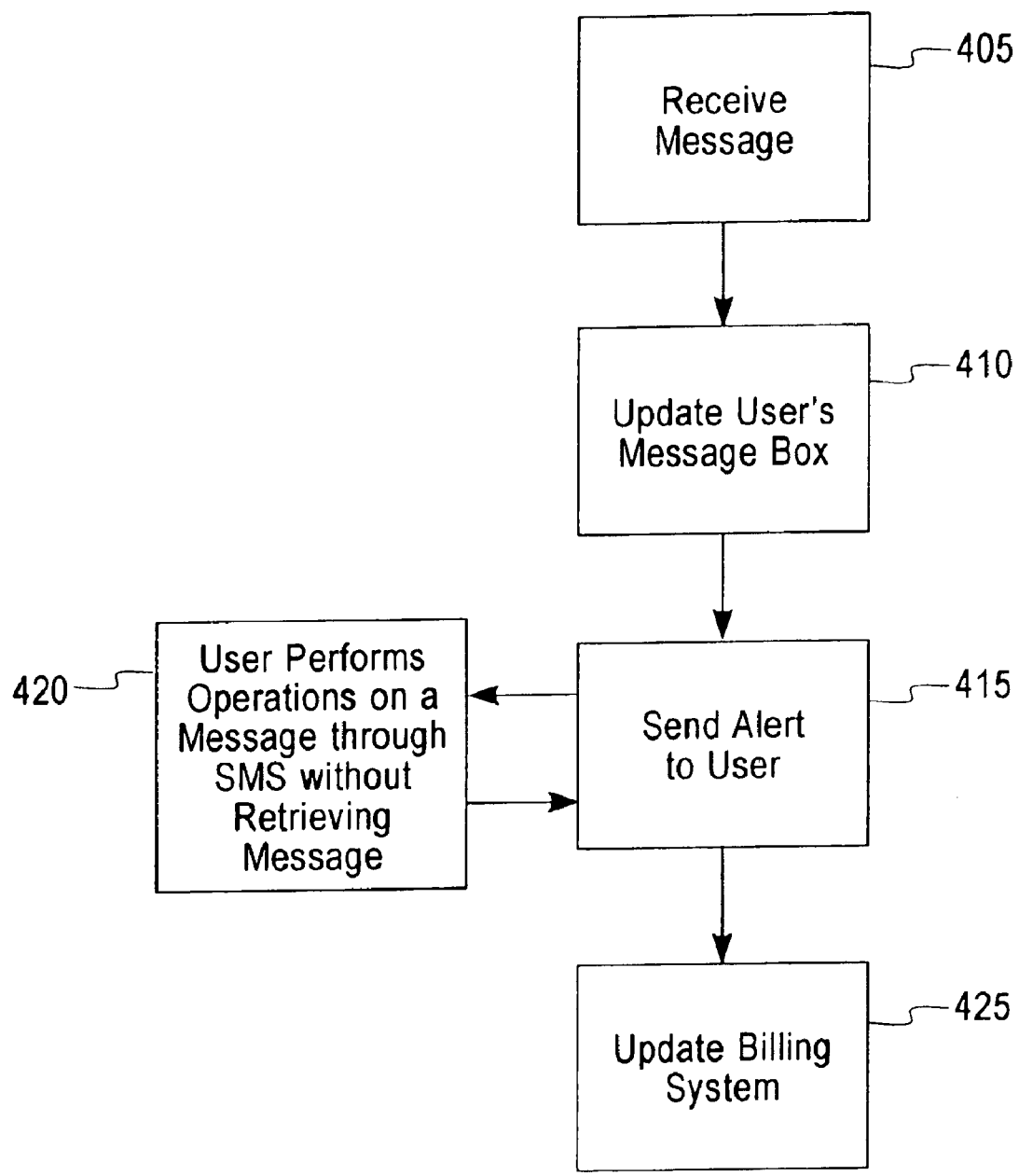
FIG. 4 is a flowchart of the steps that occur in a participating communications network once an incoming message is received using the messaging system of FIG. 1.

In summary, the receiving user 150 can perform the following actions in relation to a received message 210:

1. Append to the message 210.
2. Delete a part of the message 210.
3. Append one message to another 210.
4. Specify the time period for which the message 210 is to be retained.
5. Redirect the message 210 to another location (such as an email address).
6. Request that a print copy of the message 210 be delivered (such as to a facsimile machine).
7. Forward the message 210 to another user/system FIG. 4 is a flowchart that represents the steps that occur at the receiving communications network when an incoming message is received for a receiving user 150 who uses that communications network 150.

In step 405, the message 210 is received by the receiving communications network 150. The receiving user 150 to whom the message is directed is determined from the message header 220. Receiving user's message box is updated to indicate that the message 210 has been received, in step 410. In step 415, that receiving user 150 is alerted that the message 210 has arrived, and is awaiting collection at the message box. In response, the receiving user 150 can perform various operations, as specified above, in step 420. The billing system for that receiving user 150 is updated accordingly, depending on the charging scheme used, in step 425.

Computer Hardware and Software

Figure 5:
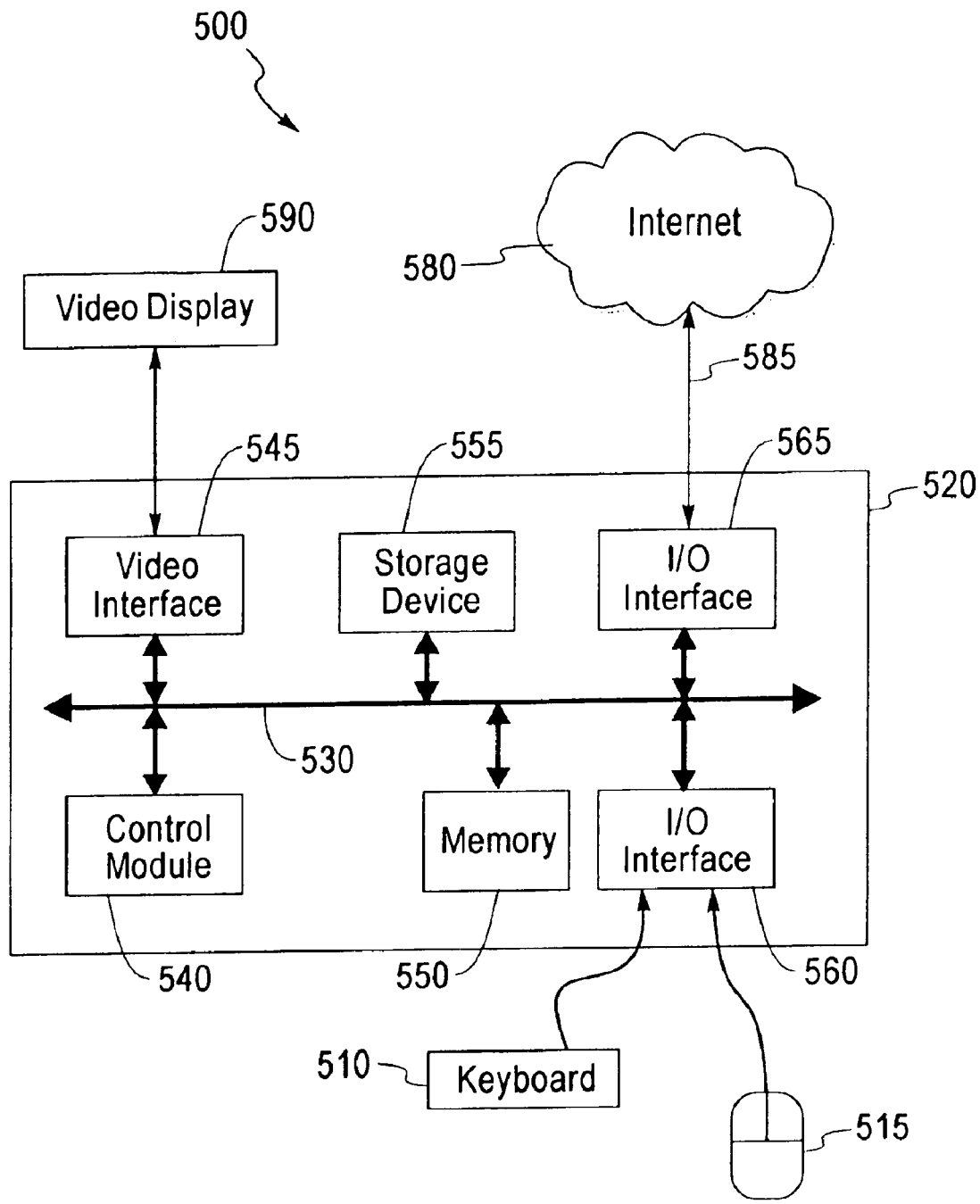
FIG. 5 is a schematic representation of a computer system that can be used in the unified messaging system of FIG. 1.

FIG. 5 is a schematic representation of a computer system 500 which can be used to perform steps in a process which implements the techniques described herein. The computer system 500 is provided for the purpose of executing computer software which is programmed to assist in performing the described techniques. This computer software executes under a suitable operating system installed on the computer system 500.

The computer software involves a set of programmed logic instructions that are able to be interpreted by the computer for instructing the computer to perform predetermined functions specified by those instructions.

The computer software is programmed by a computer program comprising statements an appropriate computer language. The computer program is processed using a compiler into computer software which has a binary format suitable for execution by the operating system. The computer software is programmed in a manner which involves various software components, or code means, that perform particular steps in the process of the described techniques.

The components of the computer system 500 include: a computer 520, input devices 510, 515 and video display 570. The computer 520 includes: processor 540, memory module 550, input/output (I/O) interfaces 560, 565, video interface 545, and storage device 555.

The processor 540 is a central processing unit (CPU) that executes the operating system and the computer software executing under the operating system. The memory module 550 include random access memory (RAM) and read-only memory (ROM), and is used under direction of the processor 540.

The video interface 545 is connected to video display 590 and provides video signals for display on the video display 570. User input to operate the computer 530 is provided from input devices 510, 515 consisting of keyboard 510 and mouse 515. The storage device 555 can include a disk drive or any other suitable non-volatile storage medium.

Each of the components of the computer 520 is connected to a bus 530 that includes data, address, and control buses, to allow these components to communicate with each other via the bus 530.

The computer system 500 can be connected to one or more other similar computers via a input/output (I/O) interface 565 using a communication channel 585 to a network 580, represented as the Internet.

The computer software program may be provided as a computer program product, and recorded on a portable storage medium. In this case the computer software program is accessed by the computer system 500 from the storage device 562. Alternatively, the computer software can be accessed directly from the network 580 by the computer 520. In either case, a user can interact with the computer system 500 using the keyboard 510 and mouse 515 to operate the programmed computer software executing on the computer 520.

The computer system 500 is provided by example only for illustrative purposes: other configurations or types of computer systems can be equally well used to implement the described techniques. The foregoing is only an example of a particular type of computer system suitable for implementing the described techniques.

It is understood that various alterations and modifications can be made to the techniques and arrangements described herein, as would be apparent to one skilled in the relevant art.

I claim:

1. A method of providing a support service for a computer implemented messaging system, the method comprising:

receiving a message for a user, wherein said message comprises a voice message;

converting said voice message into text;

transmitting said text to said user by sending a notification to the user informing the user of receipt of the message; and receiving one or more directions from the user in response to the notification to the user, each of the directions instructing one or more correspondingly predetermined actions in relation to the message, wherein said predetermined actions comprise appending one message to another message, and wherein said predetermined actions comprise appending text from one voice message to text of another voice message.

2. The method as claimed in claim 1, wherein the user can access the message from a first device, and the user receives the notification using one or more second devices different from the first device.

3. The method as claimed in claim 1, wherein the user is connected with a first communications network, and the message is received from a second communications network different from the first communications network.

4. The method as claimed in claim 1, wherein the predetermined actions comprise one or more of the following:

deleting the message;

forwarding the message to one or more third parties;

specifying the duration for which the message is to be retained;

redirecting the message to an electronic mail address;

redirecting the message to a facsimile machine; and printing and delivering the message to a specified address.

5. The method as claimed in claim 1, further comprising:

generating summary information based on the content of the message; and including the summary information in the notification to the user.

6. The method as claimed in claim 1, further comprising said user performing actions on said message prior to retrieving said message.

7. The method as claimed in claim 1, further comprising communicating with a billing system after sending said notification to said user.

8. A computer implemented messaging system comprising:

means for receiving a message for a user, wherein said message comprises a voice message;

means for converting said voice message into text;

means for sending a notification to the user informing the user of receipt of the message;

means for transmitting said text in said notification to said user; and means for receiving one or more directions instructing one or more correspondingly predetermined actions in relation to the message, wherein said predetermined actions comprise appending one message to another message, and wherein said predetermined actions comprise appending text from one voice message to text of another voice message.

9. A computer software program, recorded on a medium and capable of execution by computing means able to interpret the computer software program, the computer software program comprising:

software code for receiving a message for a user, wherein said message comprises a voice message;

software code for converting said voice message into text;

software code for sending a notification to the user informing the user of receipt of the message;

software code for transmitting said text in said notification to said user; and software code for receiving one or more directions from the user in response to the notification to the user, each of the direction instructing one or more correspondingly predetermined actions in relation to the message, wherein said predetermined actions comprise appending one message to another message, and wherein said predetermined actions comprise software code for appending text from one voice message to text or another voice message.

10. The computer software program as claimed in claim 9, further comprising software code for allowing the user to access the message from a first device, and allowing the user to receive the notification using one or more second devices different from the first device.

11. The computer software program as claimed in claim 9, further comprising software code for connecting the user with a first communications network, and allowing the message to be received from a second communications network different from the first communications network.

12. The computer software program as claimed in claim 9, wherein the predetermined actions comprise one or more of the following:

software code for deleting the message;

software code for forwarding the message to one or more third parties;

software code for specifying the duration for which the message is to be retained;

software code for redirecting the message to an electronic mail address;

software code for redirecting the message to a facsimile machine; and software code for printing and delivering the message to a specified address.

13. The computer software program as claimed in claim 9, further comprising:

software code for generating summary information based on the content of the message; and software code for including the summary information in the notification to the user.

14. The computer software program as claimed in claim 9, further comprising software code for allowing said user to perform actions on said message prior to retrieving said message.

15. The computer software program as claimed in claim 9, further comprising software code for communicating with a billing system after said notification is sent to said user.

* * * * *